(12) United States Patent
Benjamin-Guillory (10) Patent No.: US 11,049,425 B2
(45) Date of Patent: Jun. 29, 2021

(54) HANDS-ON WHEEL, TRANSPARENT MULTI-POCKET POUCH FOR DISPLAYING PERSONAL IDENTIFICATION DOCUMENTS

(71) Applicant: Paula Beth Dupas Benjamin-Guillory, DeRidder, LA (US)

(72) Inventor: Paula Beth Dupas Benjamin-Guillory, DeRidder, LA (US)

( * ) Notice: Subject to any disclaimer, the term of this patent is extended or adjusted under 35 U.S.C. 154(b) by 0 days.

(21) Appl. No.: 16/543,128

(22) Filed: Aug. 16, 2019

(65) Prior Publication Data

US 2020/0135069 A1    Apr. 30, 2020

Related U.S. Application Data

(63) Continuation-in-part of application No. 15/839,792, filed on Dec. 12, 2017, now abandoned.

(60) Provisional application No. 62/433,022, filed on Dec. 12, 2016.

(51) Int. Cl.
*B60R 11/02* (2006.01)
*G09F 21/04* (2006.01)
*B60R 13/10* (2006.01)

(52) U.S. Cl.
CPC ............ *G09F 21/04* (2013.01); *B60R 13/105* (2013.01)

(58) Field of Classification Search
CPC ............... B60R 2011/001; B60R 11/02; B60R 2011/005; B60R 7/04; B60R 13/105; B60R 2011/0057
USPC .................................................. 224/276, 483
See application file for complete search history.

(56) References Cited

U.S. PATENT DOCUMENTS

| | | | | |
|---|---|---|---|---|
| 1,482,695 | A * | 2/1924 | Nelson | G09B 29/10 40/644 |
| 5,505,356 | A * | 4/1996 | Noriega | A45F 3/14 224/250 |
| 5,833,095 | A * | 11/1998 | Russell | B25H 3/00 224/576 |
| 5,894,976 | A * | 4/1999 | Harper | F41C 33/0227 224/587 |
| 6,189,750 | B1 * | 2/2001 | Von Neumann | A45C 7/0086 224/153 |
| 6,751,805 | B1 * | 6/2004 | Austion | A41D 27/08 2/94 |
| 10,093,244 | B1 * | 10/2018 | Brown | B60R 11/00 |
| 10,654,309 | B1 * | 5/2020 | Baston | F16B 1/00 |

(Continued)

*Primary Examiner* — Adam J Waggenspack
(74) *Attorney, Agent, or Firm* — Nolte Lackenbach Siegel (57) ABSTRACT

A hands-on wheel, transparent multi-pocket pouch for displaying personal identification documents uses a multi-pocket pouch, a transparent exterior pocket and an external device fastener to mount a user's identification documents on the steering wheel of a vehicle. The multi-pocket pouch includes a transparent enclosure that has an interior pocket. The transparent exterior pocket includes a front face of the multi-pocket pouch to hold prioritized documents (e.g., a driver's license) above important, but lower priority, identification (and supporting) documents stored within the multi-pocket pouch. Supporting documents may include vehicle registration, proof of insurance, etc. The external device fastener may be connected to a rear face of the multi-pocket pouch so that the multi-pocket pouch can be attached to the vehicle's steering wheel. The present apparatus may also be made of flexible materials capable of conforming to the shape of the steering wheel.

17 Claims, 11 Drawing Sheets

(56) References Cited

U.S. PATENT DOCUMENTS

| | | | | |
|---|---|---|---|---|
| 2007/0044877 A1* | 3/2007 | Davidoff | ............... | A45C 13/02 |
| | | | | 150/113 |
| 2011/0259690 A1* | 10/2011 | Clayton | ................... | G09F 1/10 |
| | | | | 190/109 |
| 2018/0151093 A1* | 5/2018 | Willis | ..................... | G09F 3/203 |
| 2020/0238927 A1* | 7/2020 | Simmons | ............... | B60R 13/10 |

* cited by examiner

HANDS-ON WHEEL, TRANSPARENT MULTI-POCKET POUCH FOR DISPLAYING PERSONAL IDENTIFICATION DOCUMENTS

CROSS REFERENCE TO RELATED APPLICATIONS

The present application is a continuation in part and claims priority to and the benefit of non provisional patent application Ser. No. 15/839,792 filed Dec. 12, 2017, entitled "HANDS-ON WHEEL, TRANSPARENT MULTI-POCKET POUCH FOR DISPLAYING PERSONAL IDENTIFICATION DOCUMENTS" which claims benefit of provisional application No. 62/433,022 filed on Dec. 12, 2016. Each of the above referenced applications are incorporated herein in their entirety for all applicable purposes.

FIELD

The present apparatus relates generally to an identification holder. More specifically, the present apparatus relates to a transparent enclosure that can be attached to the steering wheel of a vehicle to allow access to prioritized identification and legal information to de-escalate tension during a vehicle stop (e.g., traffic stop or inspection).

BACKGROUND

During a vehicle stop, occupants of a vehicle are often asked for identification such as a driver's license and other supporting documents. Supporting documents may include proof-of-insurance, vehicle registration, passports, visas, authorization passes, and the like. In some cases, vehicle occupants may rummage through compartments of a vehicle or reach into pockets to obtain required documents. Whenever a vehicle occupant is performing actions to produce a previously unseen object the administrative personnel performing the stop may have an increased awareness and fear that a weapon may be produced.

Additionally, stress and fear for both vehicle occupants and police officers are typically increased during a stop. Movements and accesses of concealed compartments increase this already tense situation. Accordingly, it may be desirable to reduce or eliminate unnecessary movement by a vehicle operator during a stop. To address this situation, the disclosed apparatus represents, in one example, a steering wheel attachment that contains appropriate documentation to allow retrieval by either the vehicle occupant or the person performing the stop while the vehicle occupant's hands remain in plain site (e.g., remain on the steering wheel).

DETAILED DESCRIPTION

All illustrations of the drawings are for the purpose of describing selected versions of the disclosed apparatus and are not intended to limit the scope of the disclosed apparatus.

The disclosed apparatus may be used to assist in reducing the excessive use of force in custodial environments, especially in connection with traffic stops or vehicle inspections (e.g., at a border crossing port of entry). In recent years, there has been an increasing amount of reports of fatalities and/or serious bodily injuries sustained by citizens from what should have been an ordinary traffic stop. Tensions of both the police officer (or administrative personnel at a checkpoint) and the driver may be heightened during a traffic stop or vehicle inspection. In some situations, misconstruing the otherwise innocent body movements of a person occupying the stopped vehicle can unintentionally generate an escalation in the use of force by the law enforcement agent conducting the traffic stop. To address this situation, the disclosed apparatus allows a person that is involved in a traffic stop to eliminate a significant portion of body movements required to provide proper documentation. In one example, reduction of movement can be accomplished by the placement of a see-through pouch on the steering wheel. The disclosed see-through pouch (referred to as a Hands On Wheel Identification Pouch (HOWIP)) may contain documents in a priority order for inspection and eliminate movement of vehicle occupants to reach for their wallet or open concealed compartments of a vehicle (e.g., glove box or console).

Traffic stops happen often. The results of a nationwide analysis of traffic stops and searches shows that police pull over more than 50,000 drivers on a typical day and more than 20,000,000 motorists every year. There are safety concerns for both police officers and drivers during a traffic stop. The disclosed apparatus is designed to promote safety for all parties involved in a traffic stop.

In addition to traffic stops performed by police officers, there are other times when vehicle or driver information may need to be presented. Generally, these situations may be referred to as "administrative interactions." Examples of an administrative interaction may include entry through a security gate. The security officer at the gate may desire to see information prior to allowing passage of the vehicle (and occupant) through the security checkpoint. Security checkpoints may exist at many different locations having different levels of security requirements. For example, entry to a neighborhood may require a low level of security while entry to a country at a port of entry may have increased security. Still further, entry into a secure military location may have an even greater amount of security. In each of these situations, security personnel may be armed and have a concern for their own safety. The examples of this disclosure reference a traffic stop by a police officer but the benefits of the disclosed HOWIP may be applicable in additional situations and is therefore not limited to a traffic stop. Still further, a HOWIP may include an externally visible compartment to allow placement of a parking pass or other publicly visible information that may be made available while the vehicle is unattended for periods of time.

The disclosed apparatus advocates reducing or eliminating unnecessary body movements during a traffic stop. Reduction of movement can be accomplished by the placement of a see-through pouch (HOWIP) on the steering wheel. The pouch on the steering wheel may contain at least some of the following documents that are to be accessible while a driver's hands remain at or around the steering wheel (i.e., in plain view of the police officer):

Driver's license;
State identification;
Proof of automobile insurance;
Proof of vehicle registration;
Parking passes; or
Emergency contact information.

Thus, before law enforcement exits their vehicle, the occupant of the stopped vehicle may place both hands on the steering wheel in plain view while the police officer approaches the vehicle. Access to the soon to be requested documents may be provided without any concealed movements on the part of the vehicle operator. This should send a strong signal to the officer, that the occupant wants to be compliant, thereby reducing the level of force in obtaining information necessary in the course and scope of the law enforcement officer's investigatory stop.

The disclosed apparatus is useful in many ways. As mentioned above, the apparatus operates so that a driver's hands are always visible when obtaining requested information for a law enforcement officer while involved in a traffic stop. Additionally, the apparatus can also be manipulated by the law enforcement officer from the outside of the vehicle on the driver's side. In situations where the officer would prefer the driver not to move at all and keep their hands visible on the steering wheel of the car, the officer can reach in through the window and easily obtain the needed documentation to conduct the traffic stop.

The disclosed apparatus may be made using a majority of transparent materials. In some embodiments, a front cover (that is not transparent) may be used to conceal the driver's sensitive information until a need arises to present the information. For example, while the drive is away from their vehicle or the vehicle is not subject to inspection (e.g., not at a traffic stop or administrative interaction). The apparatus being made mostly of a transparent material is a useful characteristic of the disclosed apparatus because, in some embodiments, this may allow more than one document within the pouch to be viewed at one time. Specifically, documents at a lower layer pouch may be visible (in whole or in part) through all higher layer pouches.

An example of the disclosed apparatus being used in a routine traffic stop is shown below.

EXAMPLE 1

A law enforcement officer observes a suspected traffic violation by Driver A. The law enforcement officer selects a safe location to initiate a traffic stop and turns on their lightbar. Once both the law enforcement vehicle and the driver's vehicle are stopped in a safe location, the law enforcement officer approaches the driver. While approaching, the officer notes the location of the hands of Driver A (and other occupants of the vehicle).

Law enforcement officer: Good afternoon. My name is Officer Charles.

Driver A: Hello Officer Charles. How may I help you today?

Law enforcement officer: Well I am pulling you over because I noticed that you did not turn on your signal light before making that right turn back there. Can you please show me your driver's license, registration, and proof of insurance?

Driver A: Oh my! I did not realize I did that. My apologies. But yes, I have all of those documents right here on my steering when in my Hands-On Wheel Identification Pouch. I can retrieve them from the pouch, or you can retrieve them yourself if that would make you feel safer.

Law enforcement officer: Oh wow, that's helpful that you have everything you need right there in front of you. That really makes me feel safe. You can go ahead and retrieve the requested documents.

Driver A retrieves their Driver's license, vehicle registration, and proof of insurance, all while keeping both hands visible to the law enforcement officer, and hands them over to the law enforcement officer.

Driver A: Here you are, Officer Charles.

Law enforcement officer: Thank you very much. I am going to run your information and be back within 10 minutes.

The law enforcement officer runs Driver A's information and determines that they have no prior traffic violations, and that their registration and insurance are up to date. The law enforcement officer decides to give Driver A a warning instead of a ticket. The Law enforcement officer walks back over to Driver A's vehicle, where Driver A is still seated with their hands visibly on the steering wheel. The law enforcement officer gives Driver A their driver's license, proof of insurance, and vehicle registration. Driver A takes the documents from the law enforcement officer and returns them to the HOWIP, all while keeping their hands visible. Accordingly, both the law enforcement officer and Driver A feel safe and comfortable during this transaction.

As seen in the above example, the disclosed apparatus allows drivers to stay organized without losing important documents and tickets. In some embodiments, the disclosed apparatus may have a transparent pocket on the inside cover. This transparent pocket can be used to hold parking tickets from pay to park parking garages which require you to hold on to your ticket while you are parked there and then insert them into a machine when you are exiting the garage.

In other embodiments of the disclosed apparatus, a transparent pocket may be attached to the front cover of the disclosed apparatus. This pocket may be used to hold long term parking passes or stickers for school parking, apartment complexes business buildings, and the like. As mentioned above, the external transparent pocket allows for publicly visible information while other personal information remains concealed.

In some embodiments, the disclosed apparatus may allow view of multiple documents at one time without having to pull any documents out. For example, when the cover is opened, the document on the inside of the cover can be seen as well as the document in the exterior pocket of the pouch (i.e., first layer of the HOWIP). Further, when the document in the exterior pouch is removed, the document in the pouch directly adjacent to the exterior pouch (i.e., second layer of HOWIP) can be seen when multiple transparent layers of a HOWIP are implemented. Still further, documents at different layers may be positioned to be at least partially visible while other documents at more exterior layers remain in their respective pouch.

Turning now to the figures.

As can be seen in FIG. 1 through FIG. 7, example embodiments of the disclosed HOWIP provide a device that can be attached to the steering wheel 20 of a vehicle (not shown). The disclosed HOWIP apparatus acts as both a storage and a display for a user's identification documents. The term "identification documents" is used herein to refer to a group of documents that include driver's licenses, vehicle registration, insurance information, passport, visa, and emergency contacts. The disclosed apparatus is designed to facilitate visual inspection of the user's identification documents without necessitating the user's hands be removed from the steering wheel 20 of a vehicle being driven. Other documents may also be provided via a HOWIP such as a bill of lading or other inventory document related to shipping via an associated vehicle. For example, upon entry to or exit from a secure location, documentation regarding expected contents of a vehicle may be reviewed.

Figure 1:
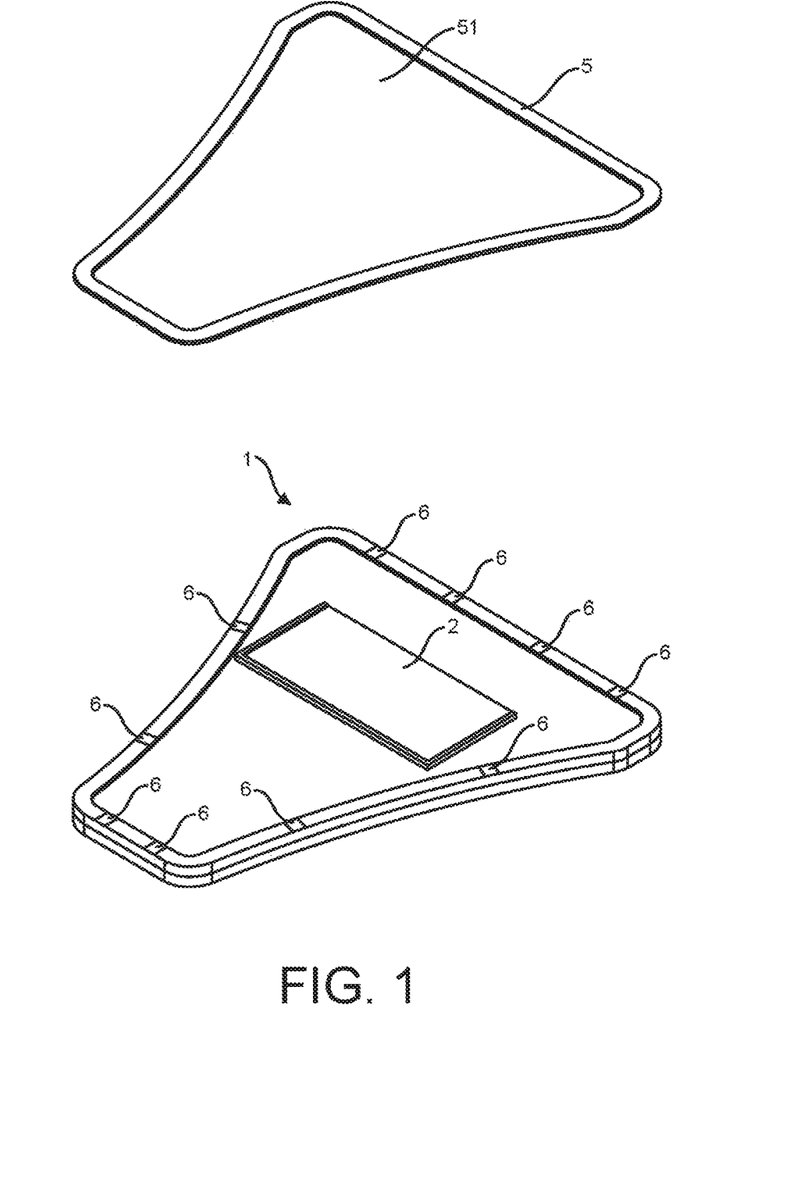
FIG. 1 is an exploded view perspective view of the disclosed apparatus, in accordance with some disclosed embodiments.
Figure 2:
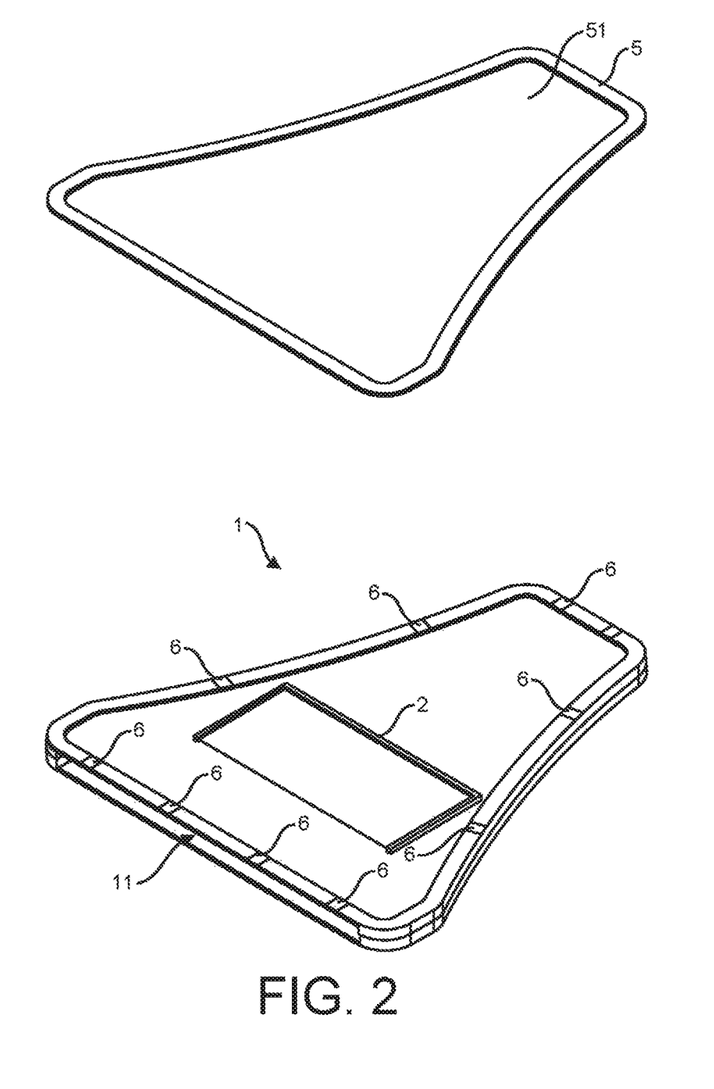
FIG. 2 is an exploded view perspective view of the disclosed apparatus showing the at least one interior pocket, in accordance with some disclosed embodiments.
Figure 3:
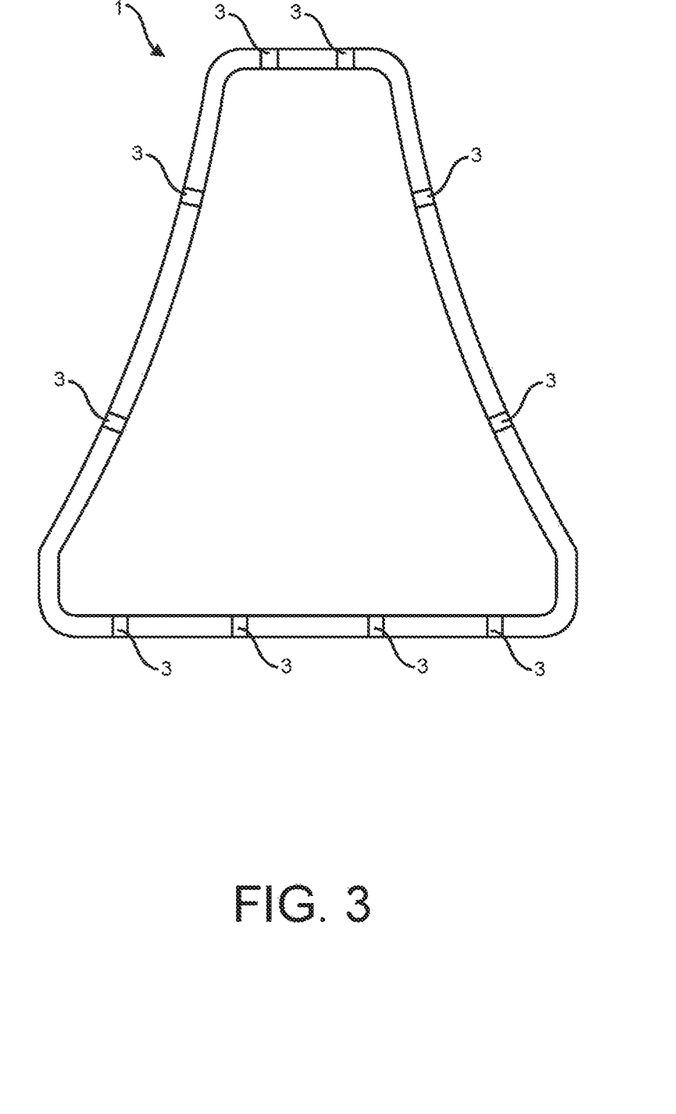
FIG. 3 is a rear view of the disclosed apparatus, in accordance with some disclosed embodiments.

As can be seen in FIG. 1, FIG. 2, and FIG. 3, to achieve the above-described functionalities, the disclosed HOWIP apparatus comprises a multi-pocket pouch 1, a transparent exterior pocket 2, and an external device fastener 3. The multi-pocket pouch 1 is preferably constructed from transparent materials and functions as a storage receptacle for identification documents. To accomplish this, the multi-pocket pouch 1 comprises at least one interior pocket 11. Further, the interior pocket 11 is integrated into an interior cavity of the multi-pocket pouch 1. As a result, the interior pocket 11 acts as a receptacle for organizing and storing identification documents (possibly in a priority order). The transparent exterior pocket 2 is a pocket for holding an identification card or highest priority document. Additionally, the transparent exterior pocket 2 is adjacently connected to a front face of the multi-pocket pouch 1. Thus positioned, the transparent exterior pocket 2 retains the identification card in a position that facilitates visual inspection. The external device fastener 3 is a fastening mechanism, which can be, but is not limited to being, a hook and loop fastener, an interconnecting clasp, an adhesive, or a magnetic coupler. Additionally, the external device fastener 3 is adjacently connected to a rear face of the multipoint pouch, opposite to the transparent exterior pocket 2. Consequently, the external device fastener 3 enables the rear face of the multi-pocket pouch 1 to be pressed against the steering wheel 20 while the front face of the multi-pocket pouch 1 is maintained in a position that facilitates visual inspection.

Figure 4:
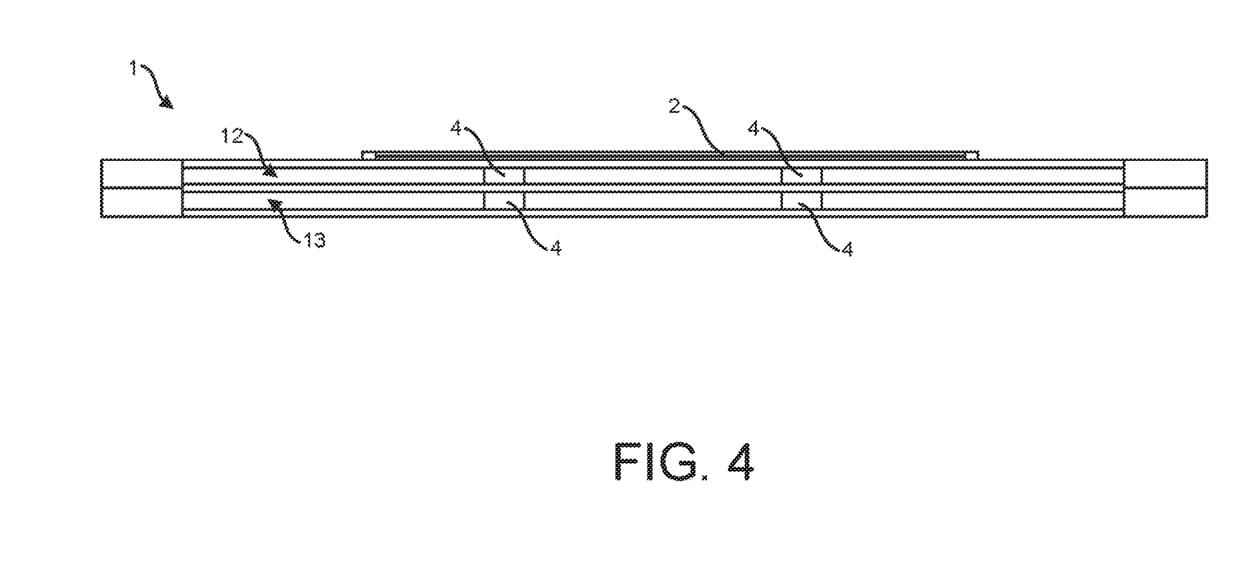
FIG. 4 is a top view of the first alternative embodiment of the disclosed apparatus, in this view the at least one interior pocket includes a plurality of interior pockets.

As can be seen in FIG. 1, through FIG. 4, the disclosed apparatus is designed to securely store the user's identification documents while the user is driving. To facilitate this, the disclosed apparatus comprises at least one pocket-closing fastener 4. Specifically, the pocket-closing fastener 4 is connected about an opening of the interior pocket 11. Accordingly, the pocket-closing fastener 4 is able to selectively seal the opening of the interior pocket 11. Thus, controlling the access to the identification documents stored within the interior pocket 11. In a first alternative embodiment, the at least one interior pocket 11 is a plurality of interior pockets 11. Furthermore, the plurality of interior pockets 11 comprises an arbitrary pocket 12 and an adjacent pocket 13. The plurality of pockets partitions the interior cavity of the multi-pocket pouch 1 to facilitate organizing the identification documents stored therein. The plurality of interior pockets 11 is preferably constructed from a series of layers, where a single interior pocket 11 is integrated into each later. As such, the arbitrary pocket 12 is positioned in between the front face of the multi-pocket pouch 1 and the adjacent pocket 13. Additionally, the adjacent pocket 13 is positioned in between the rear face of the multi-pocket pouch 1 and the arbitrary pocket 12. Accordingly, the plurality of interior pockets 11 is arranged to enable the user to position the most important identification documents directly behind the transparent front face of the multi-pocket pouch 1.

Referring to FIG. 1, and FIG. 2, while it is helpful to have the user's identification documents in plain view while driving, security concerns may arise with respect to displaying the user's personal information while the vehicle is unattended. To address these concerns, the disclosed apparatus, in some embodiments, further comprises an opaque cover 5. The opaque cover 5 is a panel of material designed to conform to the shape of the multi-pocket pouch 1. Additionally, the opaque cover 5 is attached across the front face of the multi-pocket pouch 1. As a result, the opaque cover 5 is able to obscure the identification documents stored within the multi-pocket pouch 1.

Figure 7:
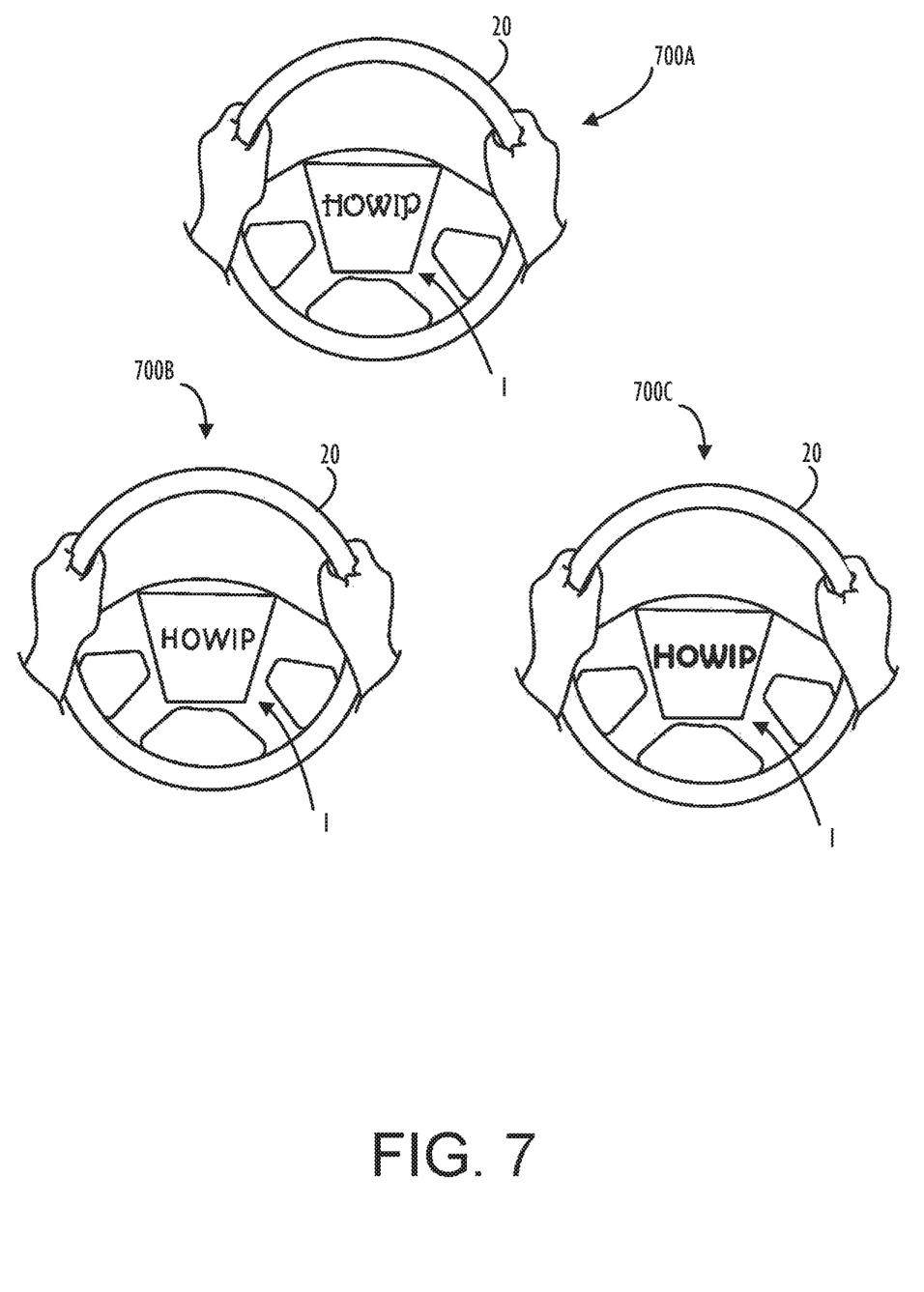
FIG. 7 is a front view showing multiple embodiments of the disclosed apparatus attached to a steering wheel, in accordance with some disclosed embodiments.

FIG. 7 illustrates in views 700A, 700B, and 700C, that opaque cover 5 may have alternate esthetic designs that provide a user to customize the appearance of a HOWIP when in use.

Figure 8A:
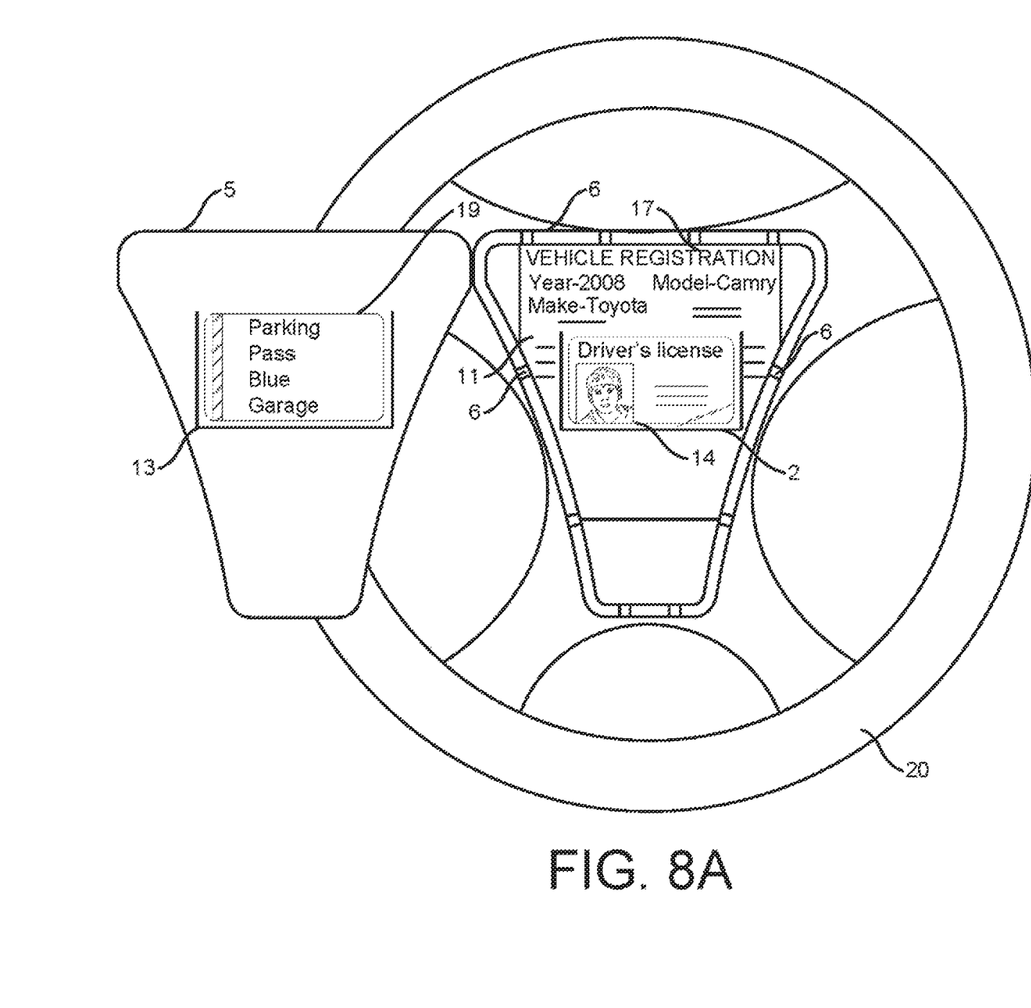
FIGS. 8A & 8B represent a front view of the disclosed apparatus in an open position attached to the steering wheel, in accordance with some disclosed embodiments.

With reference to FIG. 8A, in an alternative embodiment of the opaque cover 5, a secondary internal pocket 13 is attached on the interior face of the opaque cover 5. Specifically, the secondary pocket is positioned between the opaque cover 5 and the transparent exterior pocket 2 when the opaque cover 5 is attached to the multi-pocket pouch 1. This enables the user to store various personal items within the cover. The secondary internal pocket 13 may comprise a secondary fastener (not shown) that is used to seal the secondary pocket. Additionally, the multi-pocket pouch 1, the transparent exterior pocket 2, and the opaque cover 5 are preferably made from flexible materials.

Figure 5:
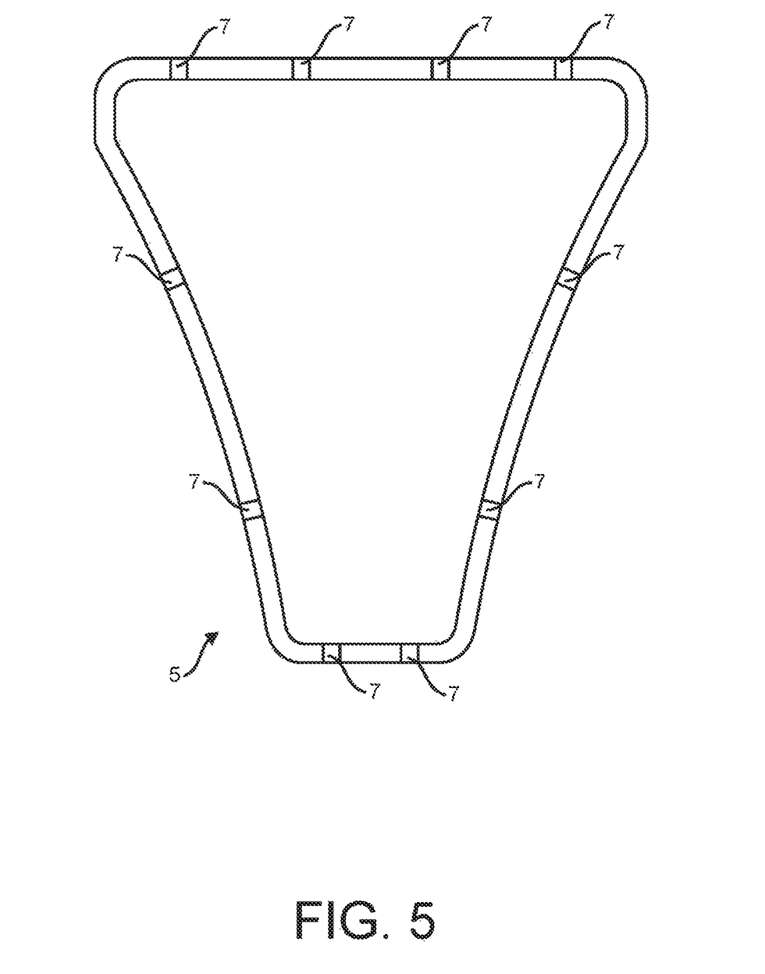
FIG. 5 is a rear view of the cover used in the disclosed apparatus, in accordance with some disclosed embodiments.
Figure 6:
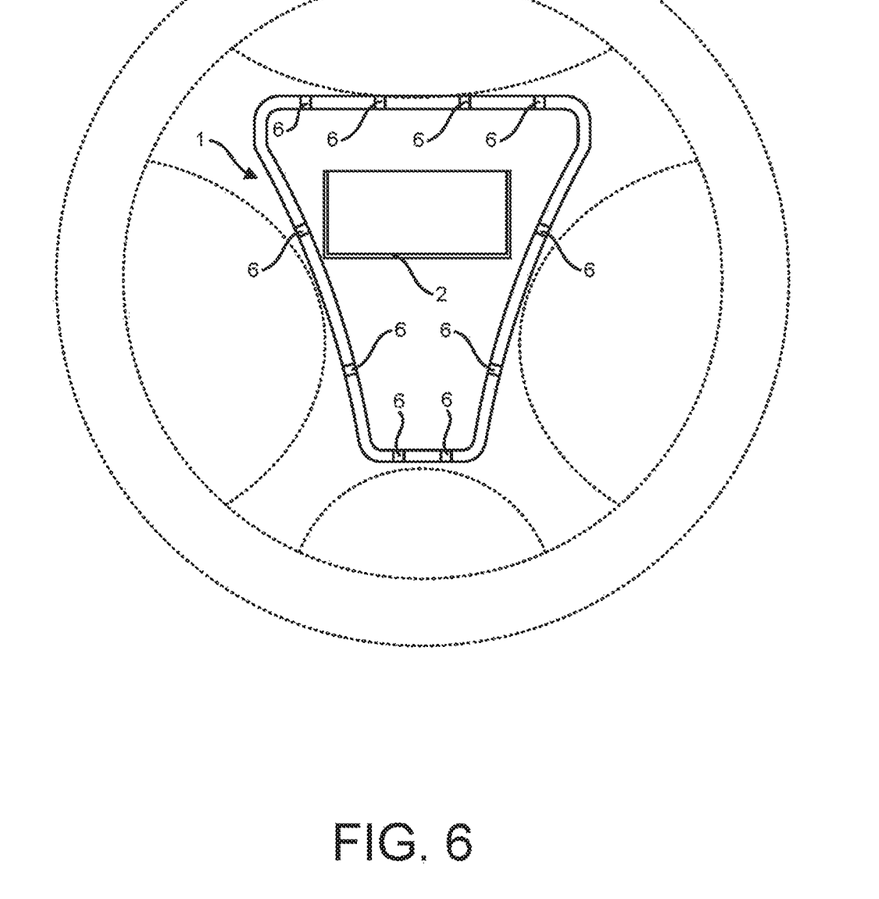
FIG. 6 is a front view of the disclosed apparatus attached to a steering wheel, in accordance with some disclosed embodiments.

As can be seen in FIG. 1 and FIG. 5, the opaque cover 5 is designed to be readily attached and detached from the front face of the multi-pocket pouch 1. To facilitate this, the disclosed apparatus may include a first plurality of cover fasteners 6 and a second plurality of cover fasteners 7. The first plurality of cover fasteners 6 may be adjacently connected to the front face of the multi-pocket pouch 1. Additionally, the first plurality of cover fasteners 6 may be perimetrically distributed around the front face of the multi-pocket pouch 1. Thus positioned, the first plurality of cover fasteners 6 ensures the opaque cover 5 will obscure the identification documents when the opaque cover 5 is attached to the first face of the multi-pocket pouch 1. Similarly, the second plurality of cover fasteners 7 may be adjacently connected to the opaque cover 5. Likewise, the second plurality of cover fasteners 7 may be perimetrically distributed around the opaque cover 5. As a result, the opaque cover 5 can be attached to the first face of the multi-pocket pouch 1. Specifically, each of the first plurality of cover fasteners 6 may attach to a corresponding fastener from the second plurality of cover fasteners 7. Consequently, the opaque cover 5 can be securely attached to the front face of the multi-pocket pouch 1. The first plurality of cover fasteners 6 and the second plurality of cover fasteners 7 are preferably the respective sides of a two component fastening mechanism. For example, a hook and loop fastener, magnetic dipole couplers, or interlocking clasps.

In still further example embodiments, the disclosed apparatus may include a design panel 51. The design panel 51 is a panel used to provide aesthetic appeal to the disclosed apparatus. As such, the design panel 51 is superimposed onto a second face of the opaque cover 5, opposite to the front face of the multi-pocket pouch 1. Thus positioned, the design panel 51 provides an aesthetic benefit to the user while the opaque cover 5 is attached to the multi-pocket pouch 1 that is in turn attached to a steering wheel 20.

As can be seen in FIG. 1, FIG. 3, and FIG. 7, the external device fastener is designed to securely attach the multi-pocket pouch 1 onto the surface of a steering wheel 20. For example, the interior surface area of a steering wheel 20 that typically includes a horn or air bag. Thus, the flexible nature of the disclosed HOWIP is intended to not interfere with these or other safety features of an automobile while in use. To facilitate this, the external device fastener 3 is preferably a plurality of detachable fasteners 3. This plurality of detachable fasteners 3 is adjacently connected to the rear face of the multi-pocket pouch 1. Additionally, the plurality of detachable fasteners 3 is perimetrically distributed around the rear face of the multi-pocket pouch 1. As a result, the plurality of detachable fasteners 3 allows that the multi-pocket pouch 1 to conform to the shape of the steering wheel 20. In some embodiments, the HOWIP may be constructed of soft materials and include no objects that may become "projectiles" when an underlying air bag deploys. This would include use of soft fasteners such as Velcro fabric to ensure safety of the driver is not compromised and safety features of the vehicle are not impaired.

Figure 8B:
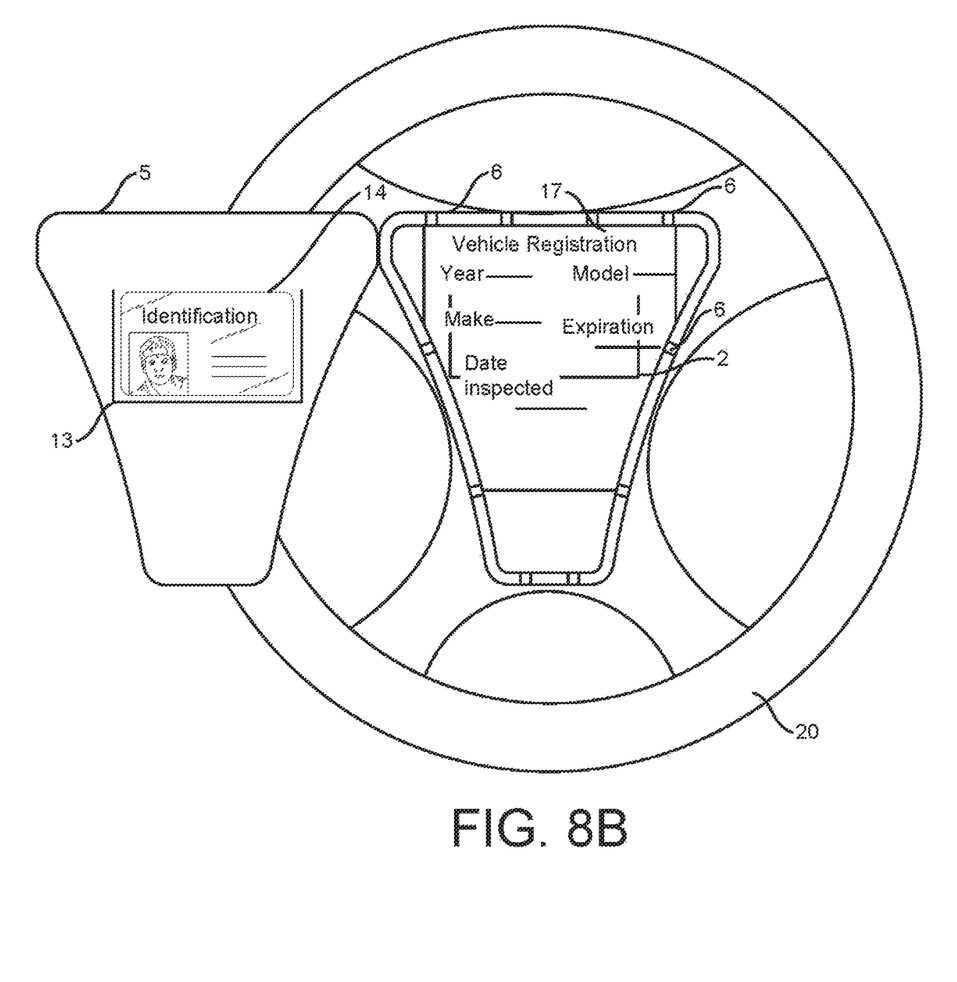

FIGS. 8A and 8B depict the multi pocket pouch 1 with the attached opaque cover 5 in an open position on the steering wheel 20. Additionally, FIGS. 8A and 8B depict an embodiment of the disclosed apparatus which includes an interior cover pocket 13. The interior cover pocket can be used to store a parking pass 19 (as illustrated in FIG. 8A) or the driver's identification 14 (as illustrated in FIG. 8B). Parking pass 19 may be used for "pay-to-park" parking lots, garages, or subscription parking lots.

Additionally, FIG. 8B further illustrates the ability of the disclosed HOWIP apparatus has to display more than one document at one time. In this example, the opaque cover 5 is in an open position on the steering wheel 20, and the driver's identification 14 is in the interior cover pocket 13. At the same time the driver's identification 14 is visible in the interior cover pocket 14, the driver's vehicle registration 17 is also visible from within the interior pocket 11. Once a document is removed from the transparent exterior pocket 2 (illustrated as empty in FIG. 8B), the document adjacent in interior pocket 11 to it is no longer obstructed and becomes completely visible. In this manner, the multiple layers of internal compartments with transparent separators allows a viewer to see the contents of both the interior cover pocket 13 and the interior pocket 11.

Figure 9:
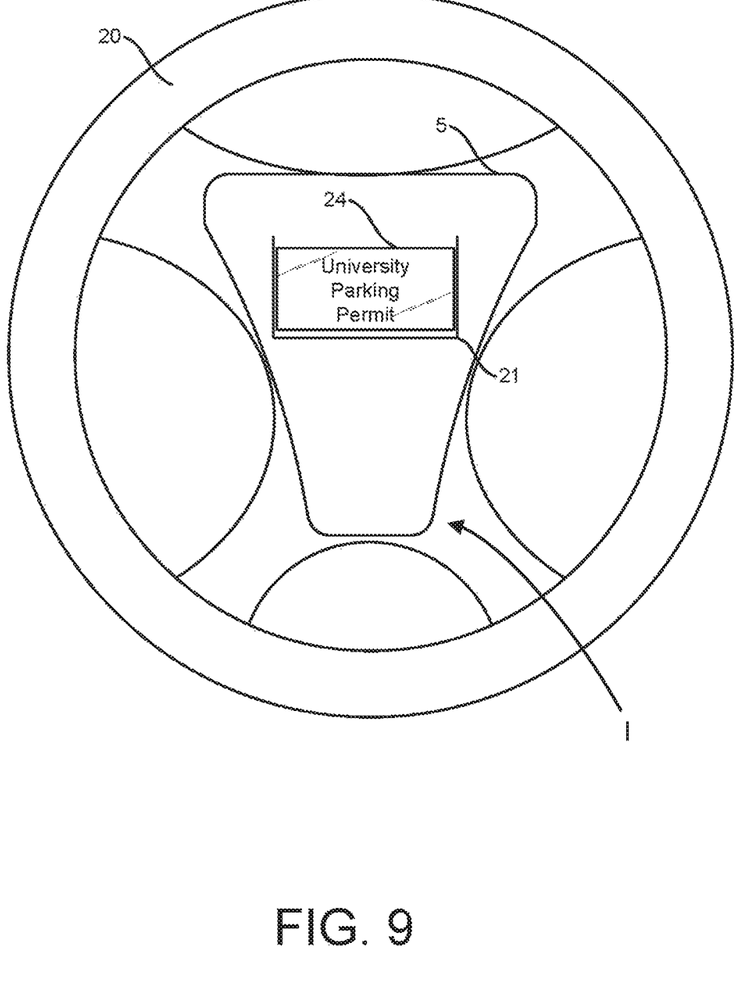
FIG. 9 is a front view of an additional embodiment of the disclosed apparatus in a closed position having an externally visible transparent compartment (e.g., pouch), in accordance with some disclosed embodiments.

FIG. 9 depicts the disclosed HOWIP apparatus with the opaque cover 5 in a closed position. This particular embodiment includes a transparent exterior cover pocket 21. The transparent exterior cover pocket 21 can be used to hold public document 24 such as pay to park parking passes or long term parking passes that are intended to be visible inside of the vehicle while it is parked in a designated area.

Figure 10:
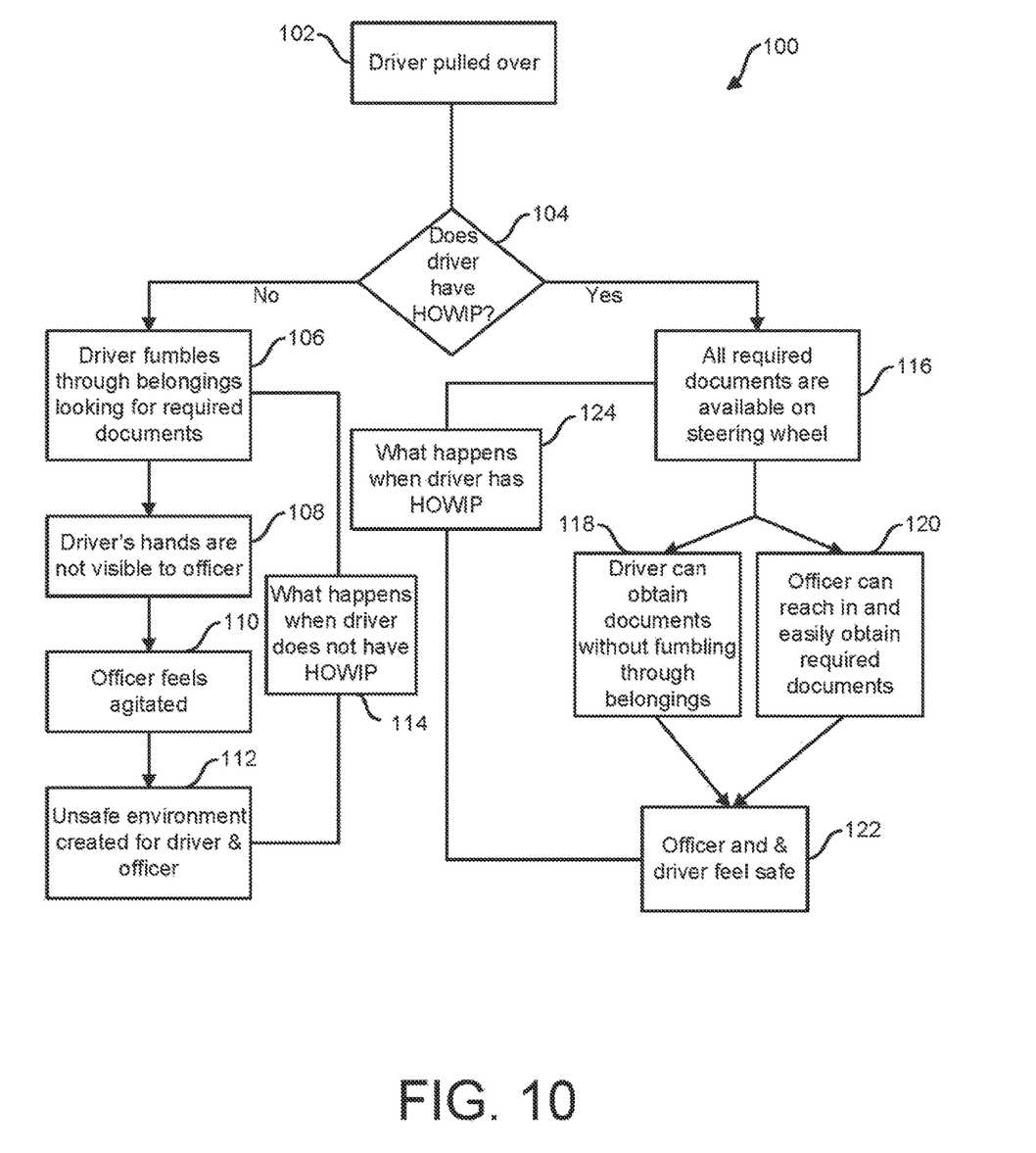
FIG. 10 illustrates a flow chart diagram of how the disclosed apparatus may be used to prevent escalation of tensions during an administrative stop.

FIG. 10 depicts a flow chart 100 of a scenario to illustrate possible different interactions with respect to an administrative stop (in this example, a traffic stop). In a first scenario of flow chart 100, outlined by sub-portion 114, a driver does not have a HOWIP. In a second scenario of flow chart 100, outlined by sub-portion 124, a driver utilizes the disclosed HOWIP apparatus installed in their vehicle.

Both of the above-referenced scenarios are included in flow chart 100 and begin with the driver being pulled over, as illustrated at block 102, by law enforcement. Of course, as mentioned above, other administrative interactions may have similar scenarios to those related to a traffic stop. Flow continues to decision 104 where the flow branches depending on whether or not the driver has a HOWIP. If the diver does not have HOWIP (the NO prong of decision 104), the driver is likely to "reach" for a wallet or make some other action within the vehicle to obtain their legal documents. In common terms, the drive may fumble through his or her belongings looking for the documents the law enforcement officer has requested during the traffic stop as illustrated at block 106. This "reaching" action and additional movement typically results in the driver's hands not being visible to the law enforcement officer as illustrated at block 108. Having the driver reaching and fumbling throughout the vehicle may case the law enforcement officer to have a feeling of agitation and unease as illustrated at block 110. Finally, at block 112 the overall activity of the vehicle occupant at the initiation of a traffic stop may lead to an unsafe environment for both the law enforcement officer and the driver as illustrated at block 112. Clearly, it would be better to avoid an unsafe environment during a traffic stop so that both the driver and the law enforcement officer can remain safe and excessive force does not need to be used.

Returning to decision 104, in contrast to the above explained conditions that contribute to an unsafe environment (or at least a perception of an unsafe environment), if the driver does have HOWIP installed in their vehicle (the YES prong of decision 104), flow continues to block 116 where a driver may have all of the documents that are required by a law enforcement officer during a routine traffic stop available on the on the steering wheel 20 via a HOWIP device. Use of a HOWIP allows the driver to obtain the required documents without having to reach, fumble, or make any movements to search through his or her personal belongings as illustrated at block 118. In fact, the driver may simply keep their hands in plain view right on the steering wheel 20 without obscuring the view of his or her hands to the law enforcement officer. Additionally, as illustrated at block 120, the law enforcement officer can (at their discretion and based on permission of the vehicle driver) reach in through the rolled down window and easily obtain the required documents themselves. The ease of this second scenario (sub-portion 124) allows both the officer and the driver feel safe as indicated by block 122. Accordingly, use of a HOWIP device as described herein may improve safety with respect to what should normally be a routine traffic stop.

Although the disclosed apparatus has been explained in relation to its preferred embodiment, it is to be understood that many other possible modifications and variations can be made without departing from the spirit and scope of the disclosed apparatus as hereinafter claimed.

What is claimed is:

1. A multi-pocket pouch to attach to a steering wheel of a vehicle, the multi-pocket pouch including multiple layers and comprising:
    a non-transparent opaque front cover forming an outermost layer, and a rear face at an innermost layer, the innermost layer to be positioned, after attachment thereto, closest to the steering wheel;
    a transparent exterior pocket adjacently connected to an inner portion of the front cover;

at least one interior pocket integrated into an interior cavity of at least one intermediate layer of the transparent multi-pocket pouch and opposite the transparent exterior pocket;

a plurality of detachable fasteners that are perimetrically distributed around each of the outermost layer, the innermost layer, and each intermediate layer such that each of the multiple layers is attached only to an adjacent next upper layer when present and an adjacent next lower level, such that each of the layers is completely detachable from the layers adjacent to it; and an external device fastener adjacently connected to the rear face of the transparent multi-pocket pouch, the external device fastener to attach the multi-pocket pouch to the steering wheel;

wherein the multi-pocket pouch is constructed in a shape and of materials to not interfere with safety features of the steering wheel.

2. The multi-pocket pouch of claim 1, wherein the transparent multi-pocket pouch, when open, allows for visibility of the contents of both the transparent exterior pocket and the at least one interior pocket.

3. The multi-pocket pouch of claim 2, further comprising at least a second interior pocket at a layer beneath the at least one interior pocket and at a layer closer to the steering wheel.

4. The multi-pocket pouch of claim 3, wherein the second interior pocket is transparent;
at least as large as the at least one interior pocket; and
allows for display of contents of the second interior pocket that are not obstructed from view by contents of the at least one interior pocket.

5. The multi-pocket pouch of claim 4, wherein contents of the transparent exterior pocket, the at least one interior pocket, and the second interior pocket are all visible, absent obstruction by other contents, simultaneously when the front cover of the multi-pocket pouch is open.

6. The multi-pocket pouch of claim 1, wherein the non-transparent front cover further includes a transparent pocket attached to an outside surface of the front cover to display publicly visible information while other contents remain concealed within the multi-pocket pouch.

7. The multi-pocket pouch of claim 6, wherein the transparent pocket attached to the outside surface of the front cover is sized to display long-term parking passes while a vehicle is unattended.

8. The multi-pocket pouch of claim 1, wherein the materials to not interfere with safety features of the steering wheel comprise soft materials to not compromise safety upon deployment of an air-bag within the steering wheel.

9. The multi-pocket pouch of claim 1, wherein the materials to not interfere with safety features of the steering wheel comprise flexible materials to not impede depression of a horn portion of the steering wheel.

10. The multi-pocket pouch of claim 1, wherein the detachable fasteners function independently of the external device fastener.

11. The multi-pocket pouch of claim 1, wherein the detachable fasteners are hook and loop type fabric fasteners.

12. The multi-pocket pouch of claim 1, wherein the detachable fasteners are magnetic fasteners.

13. The multi-pocket pouch of claim 1, further comprising at least a second interior pocket at a layer beneath the at least one interior pocket and at a layer closer to the steering wheel, the at least one interior pocket smaller than the second interior pocket, wherein the at least one interior pocket is sized for an identification card and the second interior pocket is sized to present a proof of insurance form or registration form that is larger than the identification card.

14. The multi-pocket pouch of claim 1, wherein each intermediate layer of the multiple layers includes at least one pocket-closing fastener to attach to an adjacent lower layer of the multi-pocket pouch.

15. The multi-pocket pouch of claim 14, wherein at least two of the intermediate layers includes a set of perimetrically disposed fasteners forming a detachable set of layers relative to an adjacent layer of the multi-pocket pouch without an additional means of connection between the at least two of the intermediate layers.

16. The multi-pocket pouch of claim 15, wherein the at least two of the intermediate layers may be removed from the multi-pocket pouch leaving a remainder of layers and at least the rear face of the multi-pocket pouch attached to the steering wheel.

17. A method of providing information to a police officer at a traffic stop, the method comprising:
opening a driver window of a vehicle responsive to the traffic stop;
placing hands on a steering wheel of the vehicle in plain view of an approaching police officer;
instructing the police officer that a set of identification and legal documents are available in a multi-pocket pouch attached to the steering wheel; and
allowing the officer access to the set of identification and legal documents while hands remain on the steering wheel of the vehicle, the access facilitated by a multi-pocket pouch comprising:
a non-transparent opaque front cover forming an outermost layer, and a rear face at an innermost layer, the innermost layer closest to the steering wheel;
a transparent exterior pocket adjacently connected to an inner portion of the front cover;
at least one interior pocket integrated into an interior cavity of at least one intermediate layer of the transparent multi-pocket pouch and opposite the transparent exterior pocket;
a plurality of detachable fasteners that are perimetrically distributed around each of the outermost layer, the innermost layer, and each intermediate layer such that each of the multiple layers is attached only to an adjacent next upper layer when present and an adjacent next lower level, such that each of the layers is completely detachable from the layers adjacent to it and
an external device fastener adjacently connected to the rear face of the transparent multi-pocket pouch, the external device fastener to attach the multi-pocket pouch to the steering wheel;
wherein the multi-pocket pouch is constructed in a shape and of materials to not interfere with safety features of the steering wheel.

* * * * *